No. 781,689. PATENTED FEB. 7, 1905.
G. A. STEBBINS.
APPARATUS FOR MAKING BISULFITE.
APPLICATION FILED MAR. 11, 1904.
2 SHEETS—SHEET 1.
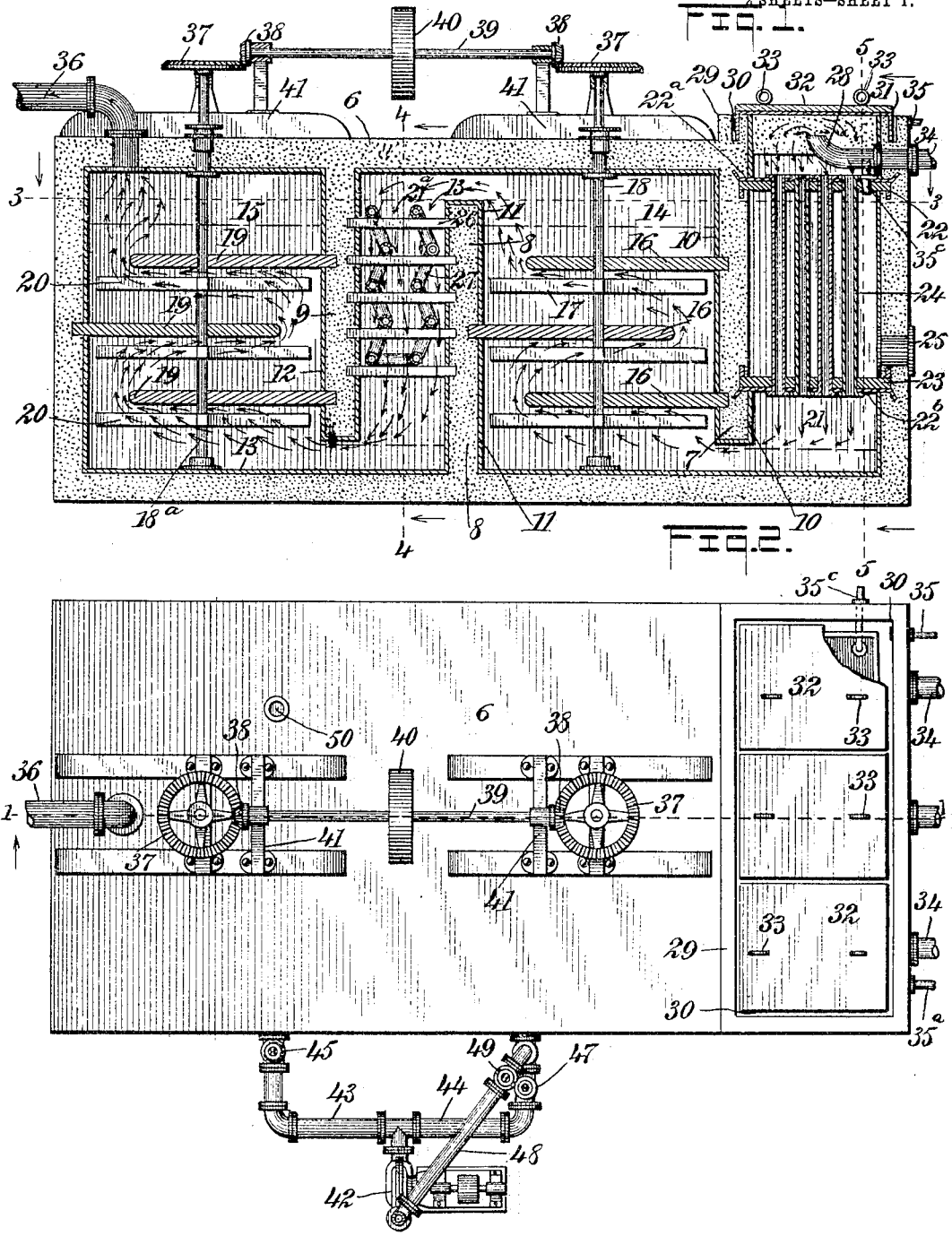
WITNESSES:
INVENTOR
George A. Stebbins
BY
ATTORNEYS

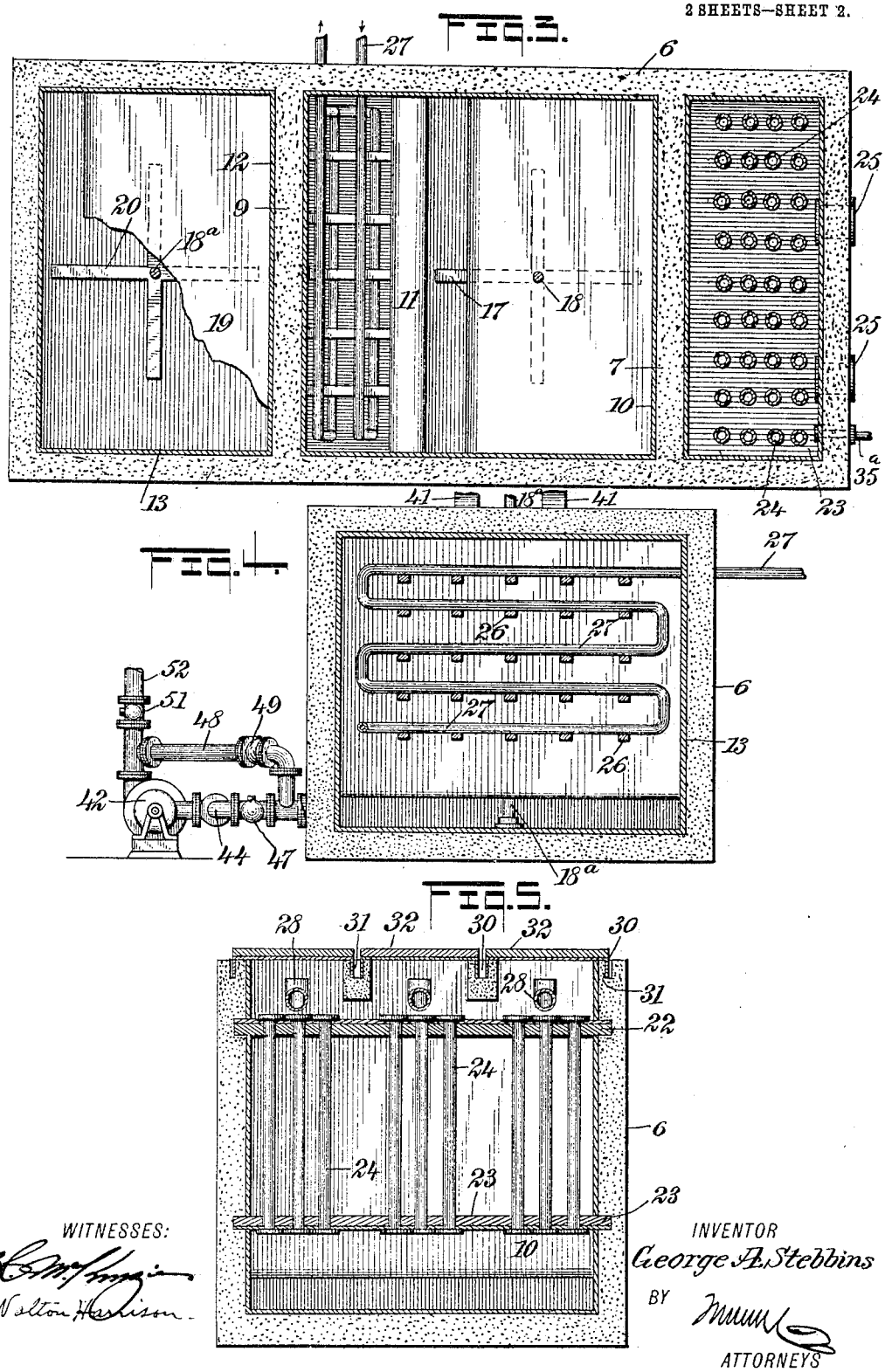

No. 781,689. Patented February 7, 1905.

UNITED STATES PATENT OFFICE.

GEORGE ALFRED STEBBINS, OF WATERTOWN, NEW YORK.

APPARATUS FOR MAKING BISULFITE.

SPECIFICATION forming part of Letters Patent No. 781,689, dated February 7, 1905.

Application filed March 11, 1904. Serial No. 197,613.

*To all whom it may concern:*

Be it known that I, GEORGE ALFRED STEBBINS, a citizen of the United States, and a resident of Watertown, in the county of Jefferson and State of New York, have invented a new and Improved Bisulfite Apparatus, of which the following is a full, clear, and exact description.

My invention relates to an apparatus for making bisulfite liquor, this liquor being intended for use in conjunction with steam at high temperatures for making wood-pulp and the like.

My apparatus admits of general use, but is peculiarly applicable in instances where it is desired to pass the sulfurous gases through a basic solution so as to form the bisulfite liquor.

The principal objects of my invention are to provide for effectively cooling the gases and liquor during the process of its manufacture and to so distribute the gases as to expose a large surface thereof to the basic solution employed.

A further object of my invention is to provide an apparatus with divers improvements hereinafter described, the several features of which are pointed out in the appended claims.

Reference is to be had to the accompanying drawings, forming a part of this specification, in which similar characters of reference indicate corresponding parts in all the figures.

Figure 1 is a vertical central section through an apparatus embodying my invention, this section being taken upon the line 1 1 of Fig. 2 looking in the direction of the arrow. Fig. 2 is a plan view of the same. Fig. 3 is a horizontal section upon the line 3 3 of Fig. 1 looking in the direction of the arrow, one of the baffle-plates 19 being partially broken away. Fig. 4 is a vertical section upon the line 4 4 of Fig. 1 looking in the direction of the arrow, and Fig. 5 is a vertical section upon the line 5 5 of Fig. 1 looking in the direction of the arrow.

A large receptacle 6 is provided with partitions 7 8 9 of any desired construction, these partitions being surfaced with acid-proof material 10 11 12. The receptacle 6 is also lined with an acid-proof material 13. By virtue of the partitions mentioned two comparatively large compartments 14 15 are formed, the compartment 14 being provided with baffle-plates 16, let into the partitions, as shown, and the compartment 15 being provided with baffle-plates 19. Stirrers 17 and 20, each having preferably the form of a revoluble member of substantially cross shape, are provided at points adjacent to the baffle-plates. There are also two compartments 21 21$^a$ in the receptacle 6 smaller than the compartments 15 15, as indicated in Fig. 1. The compartment 21 is provided with horizontal supporting-plates 22 23 and with acid-proof lead tubes or pipes 24, preferably connected together by lead plates 22$^a$ 22$^b$, as shown at the right in Fig. 1, and manholes 25 permit of access to the tubes or pipes 24. Pipe-fixtures 35$^a$ 35$^c$ are provided for the purpose of circulating water around the tubes 24, thereby cooling the same. Within the compartment 21$^a$ are cross-bars 26, of acid-proof material, and mounted upon these bars and supported thereby is a sinuous pipe 27, through which a cooling liquid may be circulated, as indicated by the arrows at the top of Fig. 3. The gases are admitted through a plurality of nozzles 28, preferably three in number, these nozzles discharging at points comparatively near the top of the apparatus.

The receptacle 6 is further provided with an upwardly-projecting rim 29, having a channel 30 cut thereinto, as indicated in Figs. 1 and 2. A number of rectangular flanges 31 are each mounted upon a plate 32, provided with handles 33, whereby the plate and flanges may be removed together. When the plate is lifted by its handles, the flanges 31 are simply withdrawn from the channel 30. The nozzles 28 are supplied by pipes 34, which virtually amount to continuations of the nozzles. The small pipes 35 are used, respectively, for the purpose of admitting water to the channel 30 and for discharging water therefrom. This water, acting in connection with the channel 30, forms an effective seal, thus forming an air-tight closure, the removable member of which is a cap.

The vacuum-pipe is shown at 36 and connects directly with the compartment 15.

The stirrers 17 and 20 are mounted upon the vertical shafts 18 18$^a$, these shafts each being provided with a bevel-gear 37, which meshes with a bevel-pinion 38, driven by a shaft 39 and a pulley 40, so that the shafts 18 18ª turn at any desired speed and preferably in opposite directions, as shown, the gearing being supported upon brackets 41 on the receptacle 6. A pump 42 (see Figs. 2 and 4) is connected with branching pipes 43 44, the pipe 43 having a valve 45 and the pipe 44 having a valve 47. The pipe 48, connecting the pump 42 and the pipe 44, is provided with a valve 49.

The top of the receptacle 6 is provided with an inlet 50 for the purpose of charging the receptacle with basic solution. The pipe 52, which is used as an outlet for the receptacle and to which the pipe 48 is connected, is provided with a valve 51.

The operation of my device is as follows: A charge of basic solution being run into the receptacle 6 through the inlet 50, the caps shown at the right of Figs. 1 and 2 are placed in position and sealed, as above described. The air is now extracted by means of the pipe 36 from the compartment 15. The basic solution is first caused to assume a common level, a portion of the liquid being transferred by means of the pump mechanism from the compartment 15 to the compartment 14. This is done by opening the valves 45 and 47, the valves 49 and 51 being closed. The exhaustion through the pipe 36 next causes the liquid to assume different levels in the respective compartments 14 15, upon the one hand, and the compartments 21 21ª, on the other hand, as indicated by broken lines in Fig. 1. The exhaustion next causes the sulfurous gases to pass through the pipes 34 into the upper portion of the compartment 21, from which they pass downwardly through the tubes 24 and below the partition 7, spreading out as far as practicable in the form of a sheet substantially parallel with and disposed below the lowermost baffle-plate 16. The gases are thus caused to expose a large surface of the basic solution. As is generally known, gases passed through a vessel containing a basic solution tend to hug the walls of the vessel upon the principle of occlusion. I find that by passing the gases under a partition, as above described, they are diffused with comparative uniformity. At the same time the admixture of gases and basic solution is agitated by the lowermost stirrer 17. The gases next pass sinuously upward, being agitated at every step by the several successive stirrers and made to travel back and forth around the several successive baffle-plates 16. The gases by this time have become heated, and it is desirable that they should be cooled. Reaching this point, they pass downwardly through the compartment 21ª, being chilled by the cooling-pipe 27, and thence pass under the partition 9, again spreading out in the form of a sheet, which breaks into bubbles, and the action above described is repeated.

I have found that the basic solution in the respective compartments 14 15 is converted at unequal rates of speed into the bisulfite liquor. The chemical action appears to be greater in the compartment 14, and the bisulfite liquor in this compartment is finished at a comparatively early stage. On account of this fact I close the valve 49 and open the valves 47 and 51 and operate the pump 42 for the purpose of removing the finished bisulfite liquor from the compartment 14. I then close the valves 47 and 51, open the valves 45 and 49, and again actuate the pump 42 so as to remove the contents of the compartment 15 into the compartment 14. I then charge the compartment 15 again with fresh basic solution. It will be noted that by this operation I continually recharge the compartment 15 with basic solution and then remove from this compartment to the compartment 14 successive quantities of the partially-formed bisulfite liquor. The operation is practically continuous, as no material interruption is caused by transferring the liquor from one compartment to the other or in discharging and recharging the two compartments 14 and 15.

It will be noted that sulfurous gases which are already heated when they enter the compartment 21 are cooled before they pass through the basic solution or through the partially-formed bisulfite liquor, according to the stage of the operation, and that they are also cooled in passing through the compartment 21ª, these two successive coolings avoiding the use of separate cooling-chambers.

Having thus described my invention, I claim as new and desire to secure by Letters Patent—

1. In a bisulfite apparatus, the combination of a hollow member provided with baffle-plates, stirrers disposed adjacent to said baffle-plates and movable relatively thereto, means for supplying a liquor into said hollow member, and mechanism for discharging gases in the form of a sheet of minute bubbles, at a point comparatively near the bottom thereof and below the level of the liquid therein contained.

2. In a bisulfite apparatus, the combination of a hollow member provided with partitions staggered relatively to each other so as to form a continuous passage subdivided into compartments, a plurality of lead tubes disposed within one of said compartments, means for circulating a cooling liquid around said lead tubes, means for charging basic solution into a compartment immediately adjacent to said lead tubes, stirrers for agitating said basic solution as gases are caused to pass therethrough, and means for forcing said gases through said lead pipes and through said last-mentioned compartment.

3. In a bisulfite apparatus, the combination of a compartment for containing a basic solution, means for forcing a gas through said compartment, and a partition provided with a straight bottom edge submerged within said basic solution, said partition being so disposed as to spread said gas into a thin sheet for the purpose of exposing a comparatively large surface of said gas to said solution.

4. In a bisulfite apparatus, the combination of a receptacle provided with a plurality of compartments, divers of said compartments being used as mixing-chambers for the purpose of facilitating chemical combination between the basic solution and the sulfurous gases, and separate cooling mechanisms disposed respectively in others of said compartments, the compartments used as mixing-chambers and the compartments containing the cooling mechanisms being arranged alternately so that the gases are cooled after passing through one mixing-chamber and before entering another.

5. The combination of a hollow member provided with compartments for holding separate portions of a liquid in different stages of development, a cooling-chamber disposed intermediate of said compartments, and mechanism for forcing a gaseous substance from one of said compartments through said cooling-chamber and through the other of said compartments in succession, so that said gaseous substance is cooled in passing from one of said separate portions of liquid to the other.

In testimony whereof I have signed my name to this specification in the presence of two subscribing witnesses.

GEORGE ALFRED STEBBINS.

Witnesses:
    FLOYD H. BASSETT,
    C. W. SIMONS.